(12) United States Patent
Chen

(10) Patent No.: US 7,472,991 B1
(45) Date of Patent: Jan. 6, 2009

(54) STRUCTURE OF AN ADJUSTABLE NOSE PAD DEVICE OF A PAIR OF EYEGLASSES

(76) Inventor: Chin-Jen Chen, No. 39-7, Lui Kuai Liao, Liu Chia Village, An Ting Hsiang, Tainan Hsien (TW)

( * ) Notice: Subject to any disclaimer, the term of this patent is extended or adjusted under 35 U.S.C. 154(b) by 0 days.

(21) Appl. No.: 11/987,684

(22) Filed: Dec. 4, 2007

(51) Int. Cl.
    *G02C 5/12* (2006.01)
(52) U.S. Cl. .................. 351/137; 351/146
(58) Field of Classification Search ............ 351/76–80, 351/136–139, 153, 145–149
    See application file for complete search history.

(56) References Cited

U.S. PATENT DOCUMENTS 7,416,299 B2 * 8/2008 Chen ........................ 351/136

\* cited by examiner

*Primary Examiner*—Huy K Mai
(74) *Attorney, Agent, or Firm*—Rosenberg, Klein & Lee

(57) ABSTRACT

A pair of eyeglasses includes a pad holding member, which has two supporting rod parts sticking out from it to face two side of a wing of a nose of a wearer; each of the supporting rods has a gripping bar-shaped protrusion, and a locating annular groove on a lower portion thereof; the nose pad device further includes a sleeve part positioned around each of the supporting rod parts in a rotatable manner, and a nose pad securely positioned around each of the sleeve parts; each of the sleeve parts has an annular toothed portion on an inner side to engage the corresponding gripping bar-shaped protrusion; each of the sleeve parts has a ringed protrusion on an inner side, which is received in the locating annular groove of the corresponding supporting rod part.

4 Claims, 7 Drawing Sheets

STRUCTURE OF AN ADJUSTABLE NOSE PAD DEVICE OF A PAIR OF EYEGLASSES

BACKGROUND OF THE INVENTION

1. Field of the Invention

The present invention relates to a nose pad device of a pair of eyeglasses, more particularly one, which includes two nose pads capable of being easily adjusted in position according to the shape and size of the wearer's nose.

2. Brief Description of the Prior Art

Common eyeglasses are equipped with two nose pads, which adjoin a middle portion of the frame to come into contact with the wearer's nose; thus, the wearer will feel comfortable when his/her nose is propping the eyeglasses. Nose pads are usually made of soft materials, and come in various designs to be used with eyeglasses for different purposes; for instance, nose pads of sport eyeglasses have openings thereon for air to flow through and for perspiration to drain easily. However, the nose pads of separate eyeglasses in the same design have the same size and intervening space, and therefore would cause the following problems:

1. If the wing of the wearer's nose has a relatively big width, the nose pads of a pair of eyeglasses will be pressed against the nose wing with two much pressure, and therefore will cause discomfort, make the wing of the nose become red and swollen, and suffer from bad blood circulation.

2. If the wing of the wearer's nose has a relatively small width, the nose pads can't be steadily propped on the nose, and in turn the eyeglasses may slip off often.

Therefore, it is a main object of the present invention to provide an adjustable nose pad device to overcome the above problems.

SUMMARY OF THE INVENTION

A nose pad device according to an embodiment of the present invention includes a pad holding member, which has two supporting rod parts sticking out from it to face two side of a wing of a nose of a wearer; each of the supporting rods has a gripping bar-shaped protrusion. The nose pad device further includes a sleeve part positioned around each of the supporting rod parts in a rotatable manner, and a nose pad securely positioned around each of the sleeve parts. Each sleeve part has an inner annular toothed portion to engage the corresponding gripping bar-shaped protrusion. Therefore, the nose pads can be turned relative to the supporting rod parts together with the sleeve parts to such a position as to be closely in touch with two sides of the wing of the wearer's nose.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
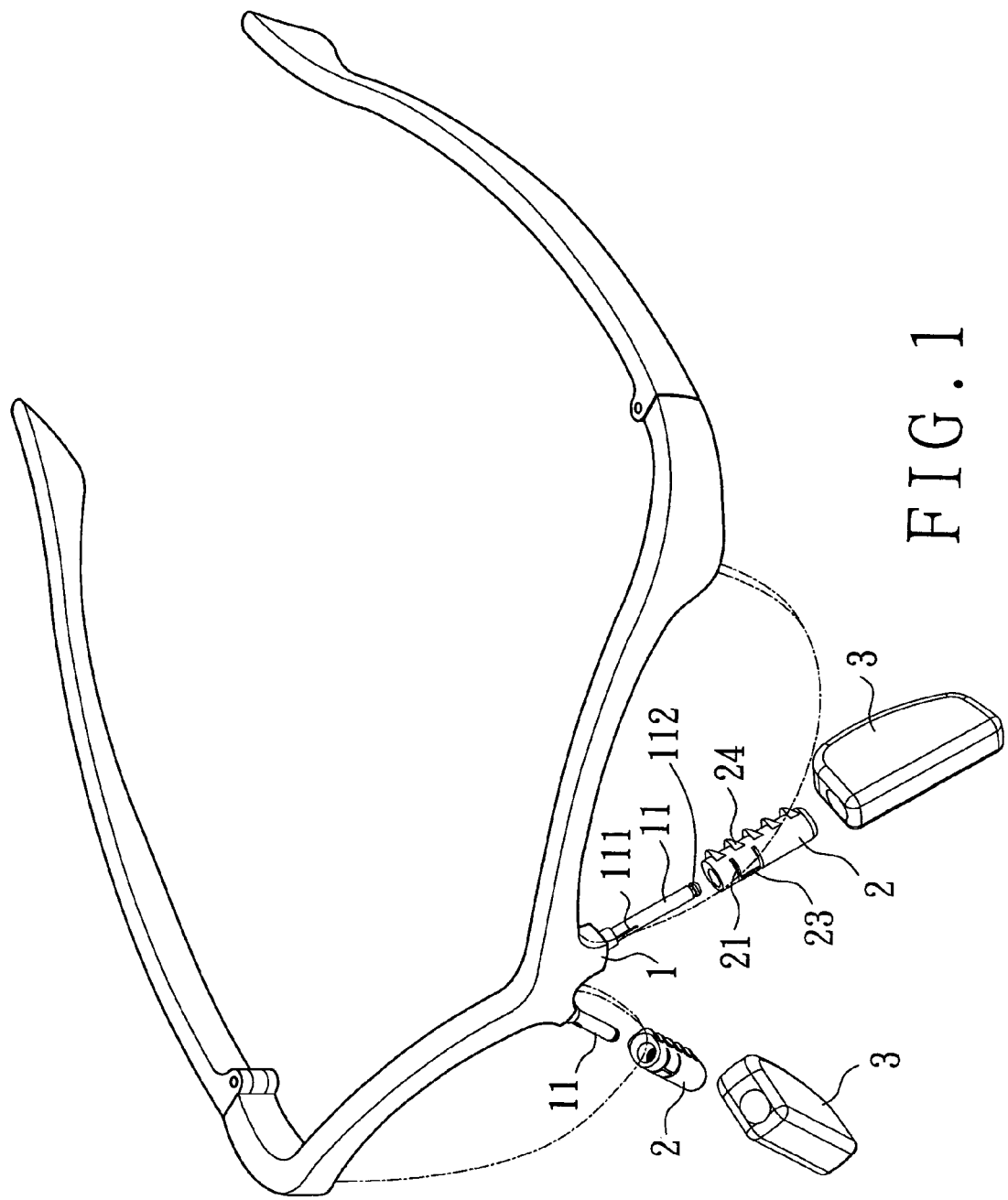
FIG. 1 is an exploded perspective view of the present invention.
Figure 2:
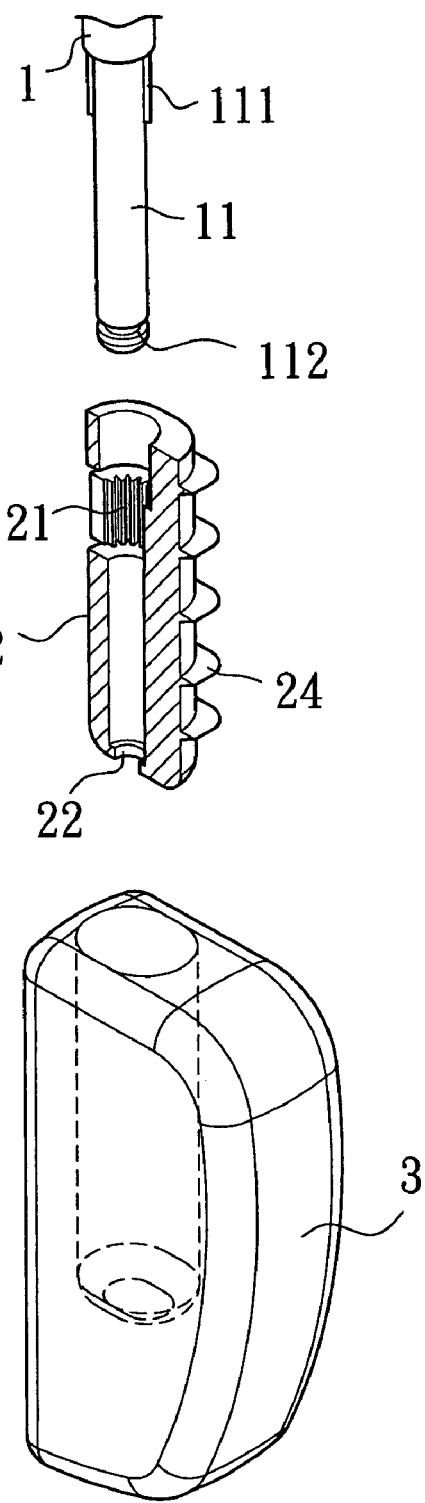
FIG. 2 is an enlarged exploded perspective view of the present invention.

Referring to FIGS. 1 and 2, a preferred embodiment of an adjustable nose pad device of the present invention includes:

a pad holding member 1, the pad holding member 1 has two supporting rod parts 11 sticking out from it to face two side of the wing of the nose of a wearer; each of the supporting rods 11 has several gripping bar-shaped protrusions 111 thereon, and a locating annular groove 112 on a lower portion thereof;

a sleeve part 2 positioned around each of the supporting rod parts 11 of the pad holding member 1; each of the sleeve parts 2 has an inner annular toothed portion 21 on an inner side thereof, and a ringed protrusion 22 on the inner side; the sleeve parts 2 are joined to the supporting rod parts 11 respectively with the ringed protrusions 22 being received in the locating annular grooves 112, and with the inner annular toothed portions 21 being engaged with the gripping bar-shaped protrusions 111;

a nose pad 3 positioned around each of the sleeve parts 2; the nose pads 3 are made of soft materials.

In assembly, first the sleeve parts 2 are positioned around the connecting rod parts 11 of the pad holding member 1 respectively; thus, the ringed protrusions 22 of the sleeve parts 2 are received in the locating annular grooves 112 of the connecting rod parts 11, and the inner annular toothed portions 21 of the sleeve parts 2 are engaged with the gripping bar-shaped protrusions 111 of the connecting rod parts 11 to prevent the sleeve parts 2 from turning relative to the connecting rod parts 11 accidentally. Next, the nose pads 3 are positioned around and securely joined to the sleeve parts 2 respectively to comprise the nose pad device of the present invention.

Figure 3:
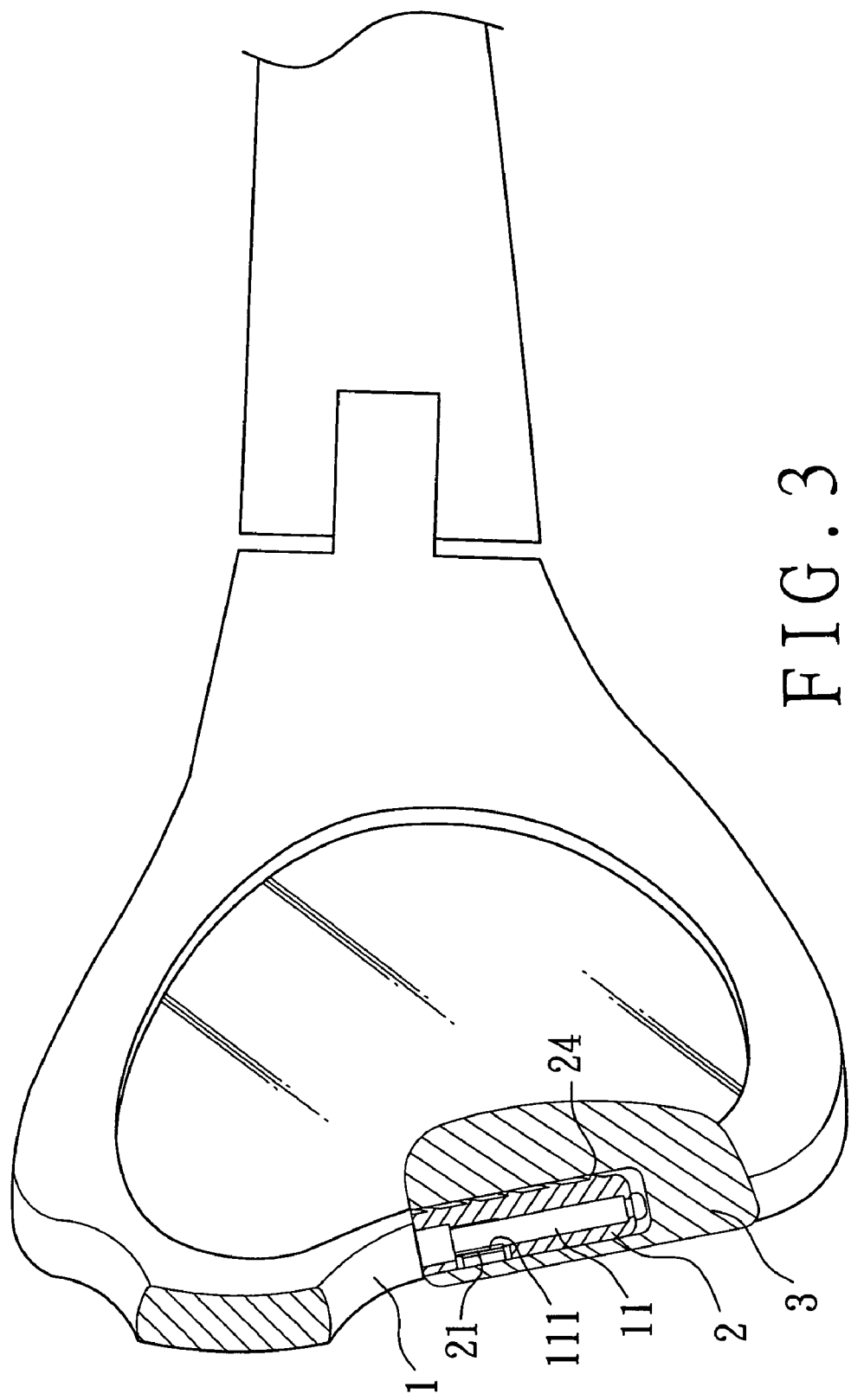
FIG. 3 is a sectional view of the present invention.
Figure 4:
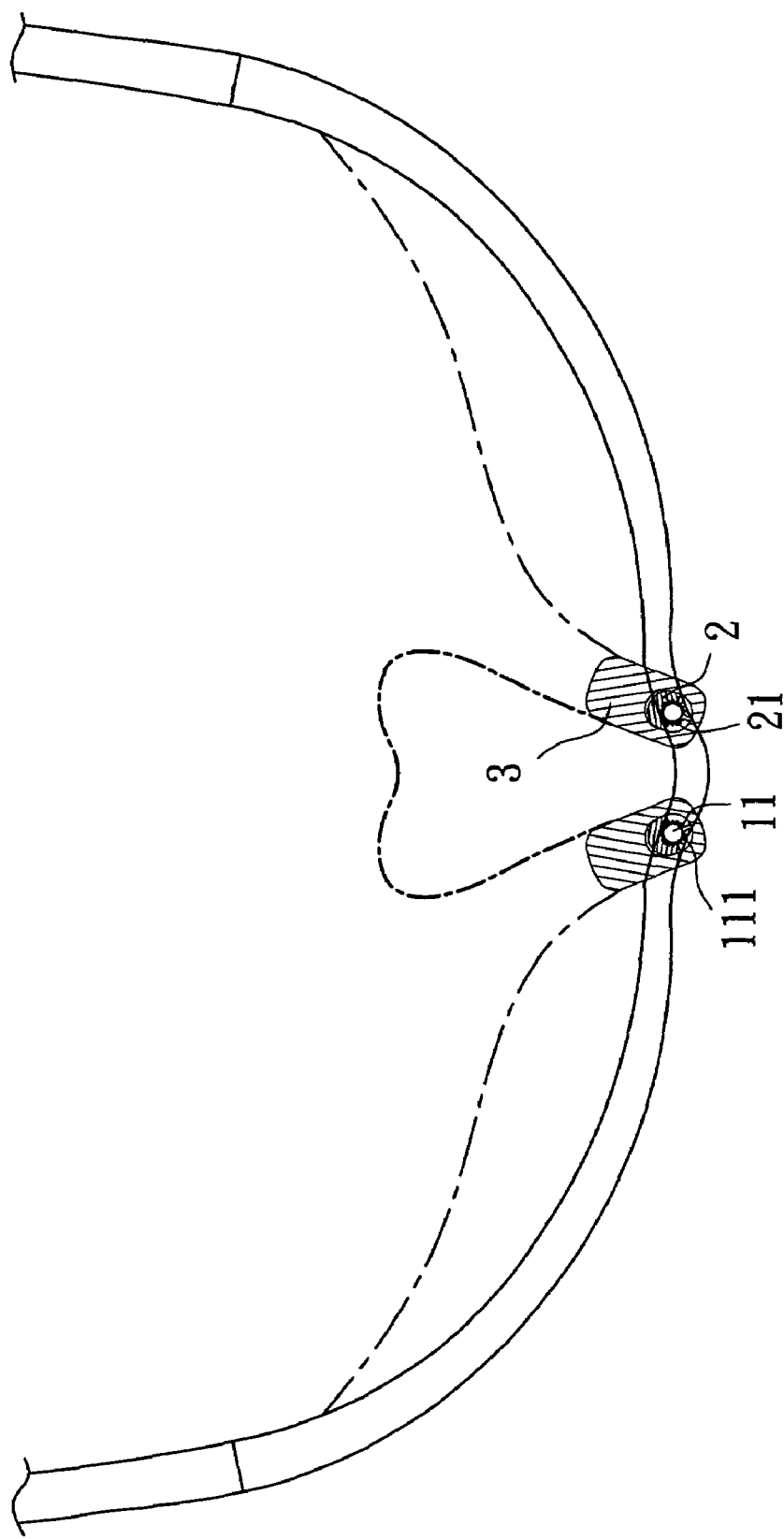
FIG. 4 is a view of the present invention being adjusted to a suitable position (1)
Figure 5:
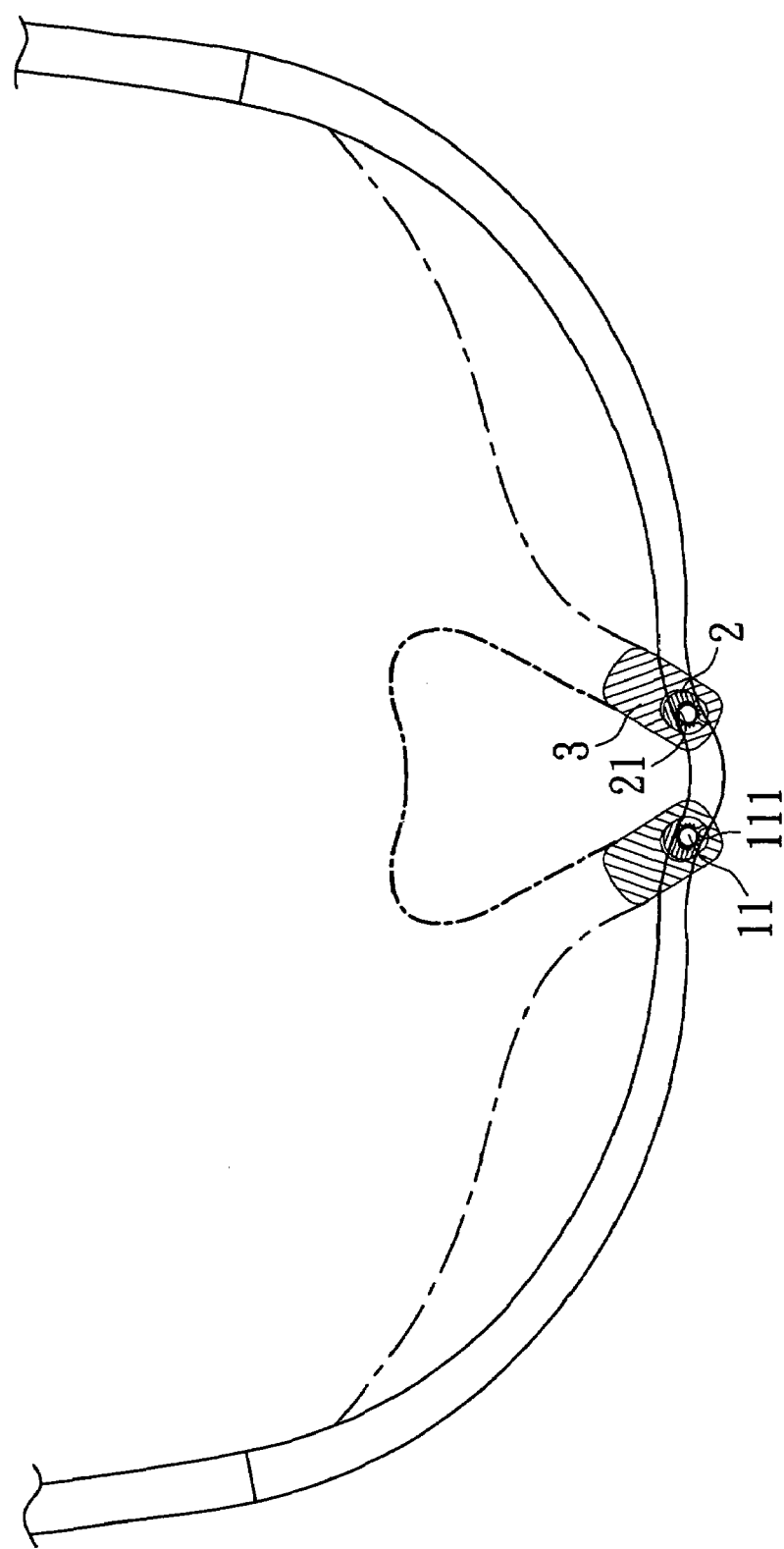
FIG. 5 is a view of the present invention being adjusted to a suitable position (2)

Referring to FIG. 3 to FIG. 5, in use, the nose pads 3 together with the sleeve parts 2 are turned relatively to the supporting rod parts 11 of the pad holding member 1 so as to make the nose pads 3 closely in touch with two sides of the wing of the wearer's nose, thus making the wearer feel comfortable as well as preventing the eyeglasses from slipping off; after the nose pads 3 are turned to a new position, the inner annular toothed portions 21 of the sleeve parts 2 will be engaged with the gripping bar-shaped protrusions 111 of the supporting rod parts 11 at other sections to prevent the sleeve parts 2 from turning accidentally.

Furthermore, the sleeve parts 2 have openings 23 thereon, which are next to the inner annular toothed portions 21, and extend through the sleeve parts 2; thus, those portions of the sleeve parts 2 that are next to the openings 23 are slightly elastic, and in turn the sleeve parts 2 can be turned relative to the gripping bar-shaped protrusions 111 of the supporting rod parts 11 more easily and smoothly. In addition, the sleeve parts 2 have fins 24 on an outer side so that the nose pads 3 can be securely joined to the sleeve parts 2. There can be more than one gripping bar-shaped protrusions 111 on each said supporting rod parts 11. Or alternatively, there can be single gripping bar-shaped protrusion 111 on each said supporting rod parts 11.

Figure 6:
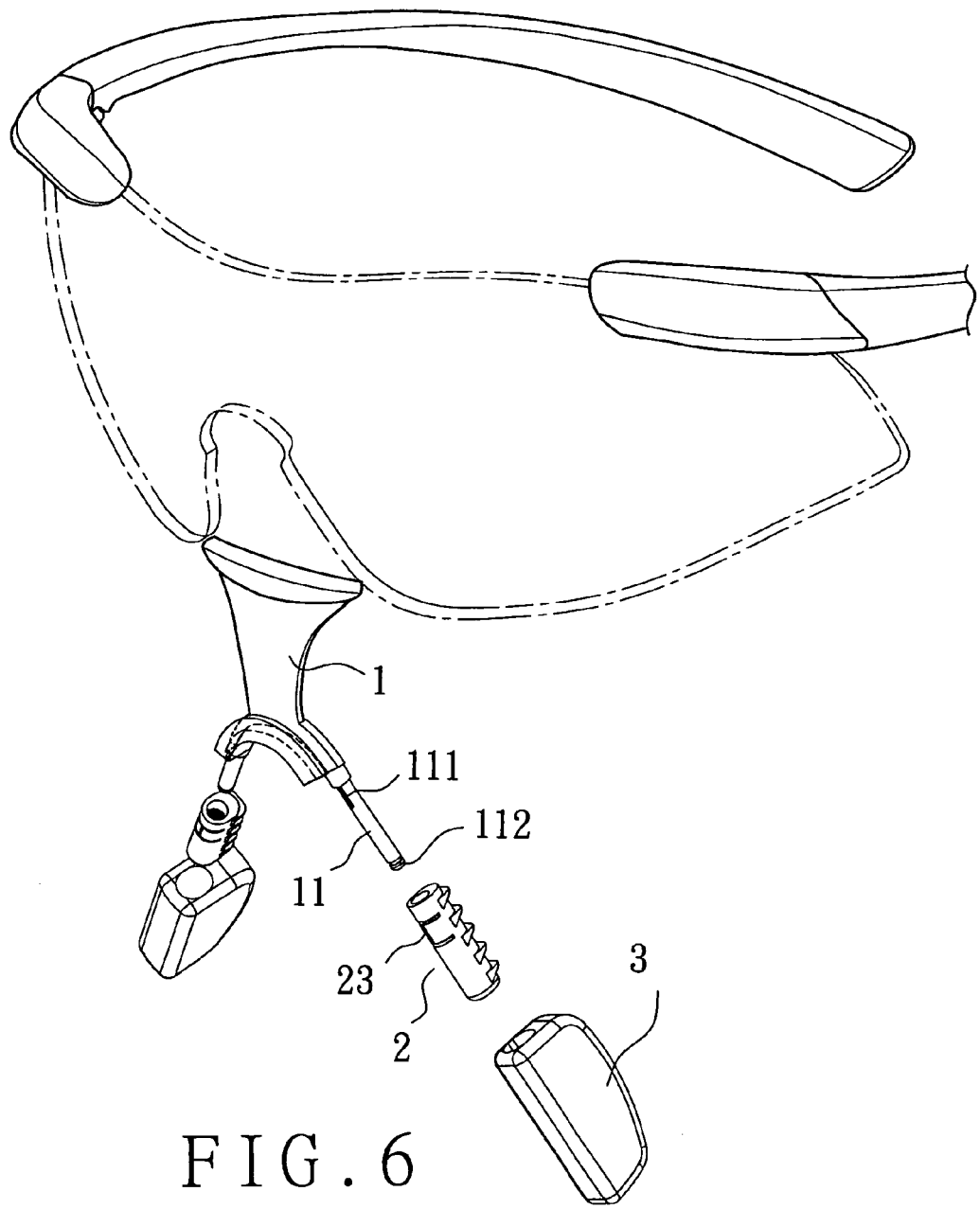
FIG. 6 shows an application of the present invention (1)
Figure 7:
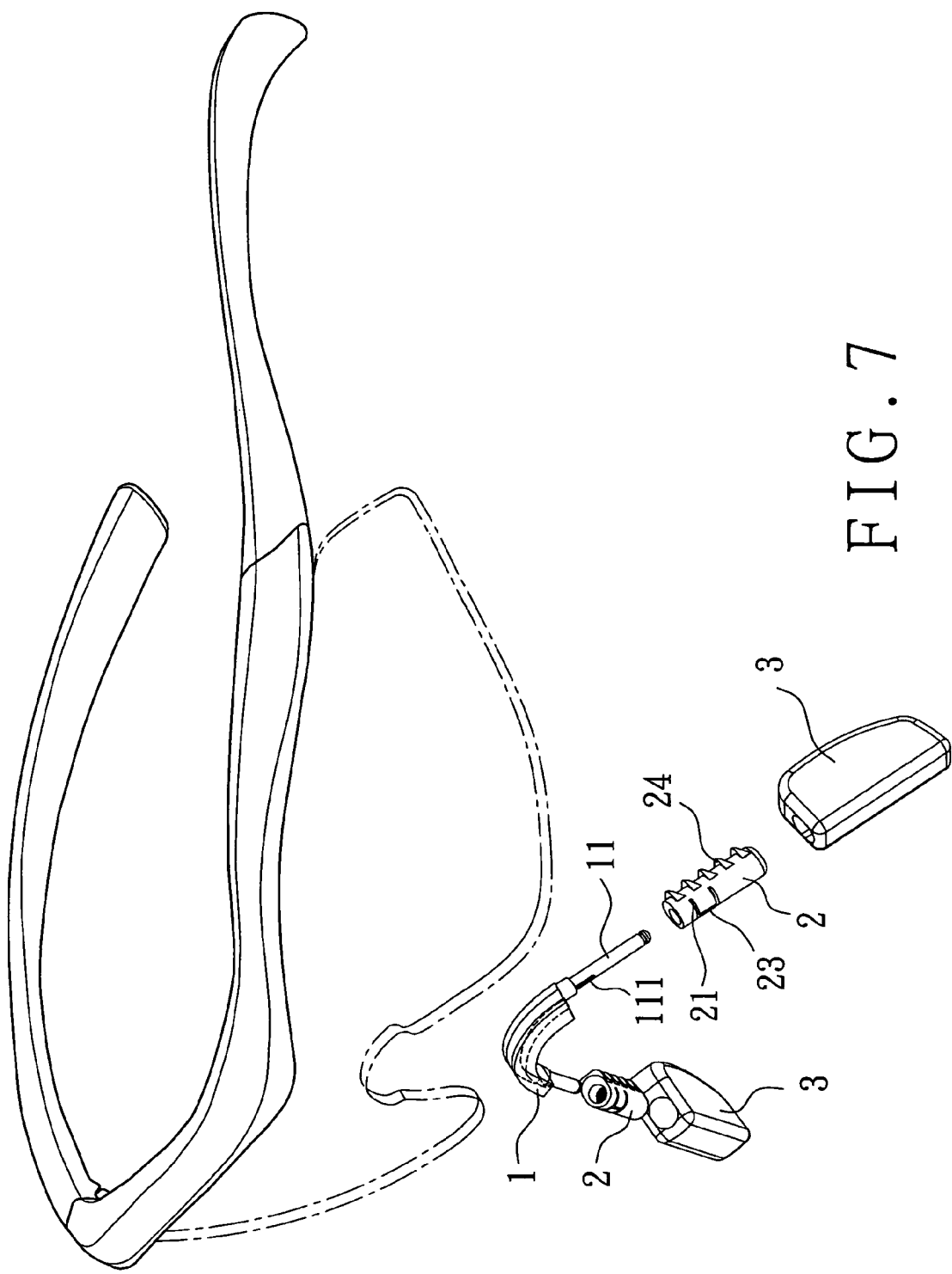
FIG. 7 shows an application of the present invention (2).

The pad holding member 1 of the nose pad device of the present invention can be formed as an undetachable part of a frame of a pair of eyeglasses. Referring to FIGS. 6 and 7, the pad holding member 1 and a frame of a pair of eyeglasses can be made separately; the nose pad device is attached to the eyeglasses frame for use afterwards. The nose pad device of the present invention also can serve to hold lenses in position together with the frame of a pair of eyeglasses.

From the above description, it can be seen that the nose pad device of the present invention has the following advantages over the prior art described in Background:

1. The nose pad device of the present invention can be adjusted in position according to the size and shape of the wearer's nose in order for the wearer to feel comfortable, and it is easy to adjust and convenient to use; the supporting rod parts have the gripping bar-shaped protrusions to engage the inner annular toothed portions of the sleeve parts so as to prevent the nose pads from turning accidentally after the nose pads have been adjusted to a new position.

2. The sleeve parts of the present nose pad device have openings next to the inner annular toothed portions. Therefore, those portions of the sleeve parts that are next to the openings are slightly elastic, and in turn the sleeve parts can be turned relative to the gripping bar-shaped protrusions of the supporting rod parts more easily and smoothly.

3. The pad holding member of the present nose pad device can be formed as an undetachable part of a frame of a pair of eyeglasses. Or alternatively, the pad holding member and a frame of a pair of eyeglasses can be made separately. Furthermore, the nose pad device also can serve to hold lenses in position together with the frame of a pair of eyeglasses. Therefore, the present invention can be applied in many different ways.

What is claimed is:

1. An adjustable nose pad device of a pair of eyeglasses, comprising a pad holding member, the pad holding member having two supporting rod parts sticking out from it to face two side of a wing of a nose of a wearer; each of the supporting rods having a plurality of gripping bar-shaped protrusions thereon; each of the supporting rods having a locating annular groove on a lower portion thereof;

a sleeve part positioned around each of the supporting rod parts; each of the sleeve parts having an annular toothed portion on an inner side thereof to engage corresponding said gripping bar-shaped protrusions; each of the sleeve parts having a ringed protrusion on an inner side; the ringed protrusions of the sleeve parts being received in the locating annular grooves of the supporting rod parts respectively;

a nose pad positioned around each of the sleeve parts; the nose pads being made of soft materials.

2. The adjustable nose pad device of a pair of eyeglasses as claimed in claim 1, wherein the sleeve parts have a plurality of openings next to the inner annular toothed portions thereof.

3. The adjustable nose pad device of a pair of eyeglasses as claimed in claim 1, wherein each of the supporting rod parts has more than one gripping bar-shaped protrusions thereon.

4. The adjustable nose pad device of a pair of eyeglasses as claimed in claim 1, wherein the sleeve parts have a plurality of fins on outer sides thereof to fasten the nose pads.

* * * * *